United States Patent [19]

Clark

[11] 3,754,102

[45] Aug. 21, 1973

[54] FRAME SYNCHRONIZATION SYSTEM

[75] Inventor: James M. Clark, Cedar Grove, N.J.

[73] Assignee: International Telephone and Telegraph Corporation, Nutley, N.J.

[22] Filed: May 10, 1972

[21] Appl. No.: 251,895

[52] U.S. Cl. .......... 179/15 BS
[51] Int. Cl. .......... H04j 3/06
[58] Field of Search .......... 179/15 BS; 178/69.5 R

[56] References Cited

UNITED STATES PATENTS 3,662,114 5/1972 Clark .......... 179/15 BS

*Primary Examiner*—Ralph D. Blakeslee
*Attorney*—C. Cornell Remsen, Jr., Menotti J. Lombardi et al.

[57] ABSTRACT

Frame synchronization for a binary data signal including a superframe having M midframes, each of the M midframes, including m subframes is accomplished by providing within the data signal a first sync signal having a first predetermined pattern disposed in each of the M midframes and a second sync signal having a second predetermined pattern different than the first pattern composed of M bits, each of the M bits being disposed in a different one of the M midframes, wherein M and *m* are integers greater than 1, such as M = 64 and m = 15. A data bit rate clock is extracted from the data signal and applied to a cascade connection of digital dividers to provide local timing, including subframe rate timing signals, midframe rate timing signals, superframe rate timing signals, and a locally generated first sync signal. A typical arrangement of a six stage shift register (where M is typically equal to 64) and feedback logic generates locally the second sync signal. A first digital comparator compares the locally generated first sync signal with the first sync signal contained in the data signal and the resulting matches and mismatches are integrated in a digital integrator, such as an up-down counter. When the count of the digital integrator is below a predetermined count threshold and a mismatch is present at a time defining when the first sync signal contained in the data signal should occur relative to the local timing, a HALT signal is produced which inhibits the flow of bit rate clock pulses to the first counter of the cascade connected counters (dividers) so as to control the phase of the timing signals with respect to the data signal to establish and maintain synchronization of the local timing to the midframes of the data signal. The received second sync signal and the locally generated second sync signal are compared a bit at a time in a digital comparator, which produce as the result of bit errors in the received second sync signal or as the result of incorrect phase of the locally generated second sync signal matches and mismatches which also are applied to the digital integrating up-down counter. When the count of the digital integrator is less than a second count threshold different than the first threshold, switching logic connects the received second sync signal to the shift register to provide therein error free bits of a portion of the received second sync signal which through the cooperation of the feedback logic generates an error free locally generated second sync signal so that in cooperation with synchronization of the midframe, the superframe is synchronized.

10 Claims, 7 Drawing Figures

FRAME SYNCHRONIZATION SYSTEM

BACKGROUND OF THE INVENTION

This invention relates to digital time division multiplex (TDM) communication systems and more particularly to a frame synchronization system for utilization therein. The invention is particularly useful for very lengthy TDM formats, and especially for asynchronous demultiplexers and/or when a small percentage of the bit rate may be allotted for sync bits.

The copending application of J. M. Clark, Ser. No. 36,744, now U.S. Pat. No. 3,662,114, filed May 13, 1970, whose disclosure is incorporated by reference, discloses a frame synchronization system which provides frame synchronization using two sync signals. This frame synchronization system operates upon binary data signals having a multiframe including N frames, each of the frames including M channels and a first sync signal, at least one of the channel signals including in each of the frames a different one of (N-1) subchannel signals and a second sync signal. The equipment involved employs two sync signal detectors, one being responsive to the first sync signal and a first predetermined local timing signal therefor to provide a first control signal indicative of the phase relation between these two signals and the other sync detector being responsive to the second sync signal and a second predetermined local timing signal therefor to provide a second control signal indicative of the phase relation between these two signals. The two control signals are sampled by two different sampling circuits. The outputs of the sampling circuits are applied to two different decision circuits or integrators whose outputs control the timing of two different cascade connected digital counters and timing signal generators used to generate necessary timing signals including the two predetermined local timing signals. The first digital counter and generator is driven by a bit rate clock which is inhibited when the decision circuit associated therewith indicates an out-of-sync condition. The second digital counter and generator is driven by a frame rate clock from the first counter and generator which is inhibited when the decision circuit associated therewith indicates an out-of-sync condition. In one disclosed embodiment, the decision circuits are dual integrators each generating two signals to separately control the inhibiting when required. In another disclosed embodiment, the decision circuits are single integrators each producing one signal to control the inhibiting when required, the signal of the decision circuit associated with the second sync signal being connected in a cooperating manner with the signal of the decision circuit associated with the first sync signal to control the inhibiting of the bit rate clock.

In a copending application of R. H. Haussmann and M. A. Epstein Ser. No. 205,093, filed Dec. 6, 1971, whose disclosure is incorporated by reference, there is disclosed still another frame synchronization system operating on binary data signals having two different sync signals. In this arrangement a binary data transmission system employing a sending station and a receiving station with intermediate stations disposed therebetween in tandem is provided. The binary data signal transmitted by such a system includes in a predetermined time division multiplex frame period M groups of time division multiplex channel data signals, each of the groups of channel signals having a normal sync signal. Each of the intermediate stations and the receiving station monitor the received and transmitted M groups of channel data signals on a time sequential basis. A frame synchronization system detects the lack of sync in any of the groups applied thereto on a time sequential basis and substitutes for the thusly detected erroneous group of channel signals dummy data signals including dummy sync signals. To prevent stations subsequent to the station substituting the dummy data signals for erroneous normal data signals from providing an erroneous error indication and an erroneous substitution of dummy data for error free normal data signal, the frame synchronization system detects, establishes and maintains sync of each monitored group of channel signals in response to either the normal sync signal or the dummy sync signal. The frame synchronization system provides a variable search time to establish the desired synchronization to either normal or dummy sync signals for each group of channel data signals coupled thereto.

SUMMARY OF THE INVENTION

An object of the present invention is to provide still another frame synchronization system capable of operating on two different sync signals.

Still another object of the present invention is to provide a frame synchronization system for binary data signals including a superframe having M midframes with each of the M midframes including *m* subframes, the data signal including a first sync signal having a first predetermined pattern disposed in each of the M midframes and a second sync signal having a second predetermined pattern different than the first predetermined pattern composed of M bits with each of the M bits being disposed in different one of the M midframes, where M and *m* are integers greater than one.

A further object of the present invention is to provide a frame synchronization system wherein the data signal is synchronized first by synchronizing the midframes in response to the first sync signal and then synchronizing the superframe in response to the second sync signal with a structural relationship existing between the synchronization of the midframe and the superframe in the form of a signal decision circuit.

A feature of the present invention is the provision of a frame synchronization system for a time division multiplex binary data signal having a superframe including M midframes, each of the M midframes including *m* subframes, the data signal including a first sync signal having a first predetermined pattern disposed in each of the M midframes and a second sync signal having a second predetermined pattern different than the first predetermined pattern composed of M bits, each of the M bits being disposed in a different one of the M midframes, where M and *m* are integers greater than one, comprising: a source of the data signal; first means coupled to the source to produce timing signals including the first sync signal; second means to locally generate the second sync signal; a first digital comparator coupled to the source and the first means responsive to the data signal and the first sync signal to produce a first output signal indicative of the matches and mismatches between the data signal and the first sync signal; an integrating circuit having a plurality of threshold levels coupled to the first comparator responsive to the matches and mismatches to produce a first control signal indicative of the phase relation between the first sync signal contained in the data and the first sync signal generated by the first means; third means coupled to the first comparator, the integrating circuit and the first means responsive to at least the mismatches and the first control signal below a first one of the threshold levels to control the phase of the timing signals with respect to the data signal to establish and maintain synchronization of the M midframes; a second digital comparator coupled to the source, the second means and the integrator circuit responsive to the second sync signal contained in the data signal and the second sync signal generated by the second means to produce a second output signal indicative of the matches and mismatches between the M bits of the second sync signal contained in the data signal and the M bits of the second sync signal generated by the second means, the second output signal being coupled to the integrating circuit to produce a second control signal; and fourth means coupled to the source, the second means and the integrator responsive to the second control signal below a second one of the threshold levels different than the first one of the threshold levels to substitute the second sync signal contained in the data signal for the second sync signal generated by the second means to provide in the second means the second sync signal identical to the second sync signal contained in the data; the third and fourth means cooperating to establish and maintain synchronization of the superframe.

BRIEF DESCRIPTION OF THE DRAWINGS

Above-mentioned and other features and objects of this invention will become more apparent by reference to the following description taken in conjunction with the accompanying drawing in which.

DESCRIPTION OF THE PREFERRED EMBODIMENTS

Figures 1, 2, 3:
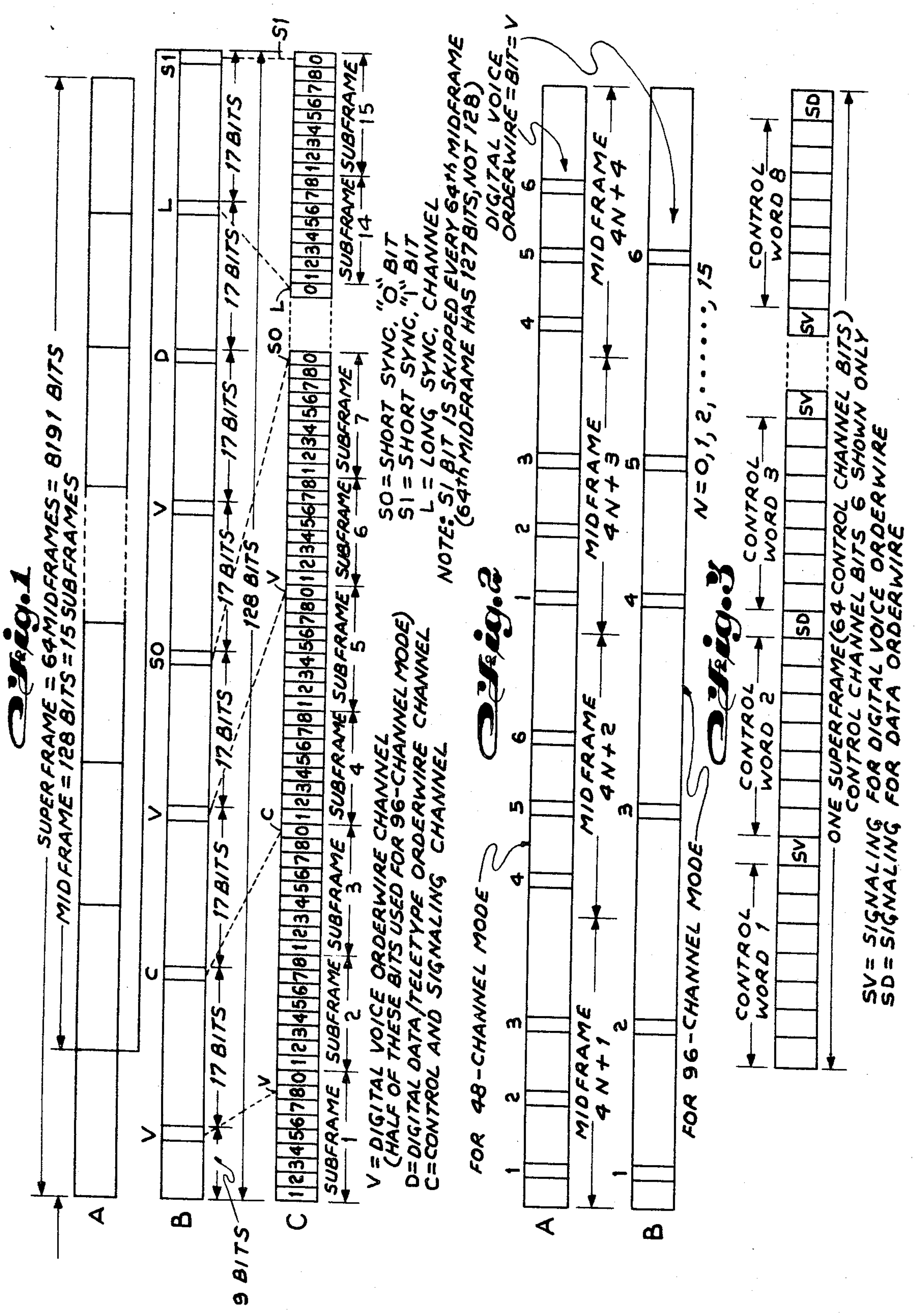
FIGS. 1, 2 and 3 illustrate the frame structure of the data signal upon which the frame synchronization system of the present invention operates.

It is known in the prior art that there are three basic types of sync signal formats. With the long frame format with which the frame synchronization system of the present invention operates, each of these basic types of sync signal formats have a disadvantage. The first type of sync format is a lumped sync format which uses one sync code word of N adjacent bits. The detection of this type of sync signal format requires an N-bit shift register which permits searching the data to find the entire sync code at the bit rate. One disadvantage of this is that as the length of the code decreases the probability of accepting a random sample of N data bits as a valid sync signal increases. The lumped-sync format does not fit well into data transmission systems, since the sync bits must be adjacent and the sync signal rather long which causes an interruption of the data stream when the sync code is transmitted. In an asynchronous multiplexer employing elastic stores to adjust the asynchronous bit rates coming from different sources, these elastic stores at both the transmit and receive portion of the system must be relatively long to absorb the momentary backlog of data when the lump sync code signal is transmitted.

The second type of sync code format is defined as a distributed type which employs a sync code spread out in the data format with the sync bits of this distributed type sync signal being usually equally-spaced with many data bits between two consecutive sync bits. Due to this distributed type of sync code format, it is not possible to search for the entire code at the bit rate without using a vary large amount of storage.

The third type of sync code format is a partly lumped and partly distributed sync code format. Typically, such a format uses a number of lumped codes of equal length distributed with equal spacing in the data frame. For a fixed sync bit rate, this format typically yields better search times than either of the lumped or distributed types of sync codes signal formats. However, like the lumped sync format, it adds a significant amount of elastic storage requirements.

For the purpose of synchronizing the superframe of the data signal with which the present frame synchronization system is employed, it can be concluded that no single sync format of the above three types of sync signal formats is satisfactory. To avoid enlarging the elastic storage of an asynchronous multiplexer, a distributed code can be employed, but with a superframe of 8,191 bits and using 1 percent of the supergroup bit rate for the sync bits, the average search time is about 0.26 seconds. Even with special circuits to speed up the search, the synchronization will not meet the requirements of a minimum amount of search time.

In accordance with the principles of the present invention two sync code signals and two synchronization circuits are employed. The two codes are referred to as a "short" (or first) sync code signal and a "long" (or second) sync code signal. The superframe is divided into equal parts (midframes) as convenient to other format requirements. A short distributed sync code signal permits fast synchronization of the midframes because the midframes are much shorter (128 bits) than the superframe. A second sync code signal and sync circuit is used to complete the frame synchronization by synchronizing the superframe, taking advantage of the prior midframe synchronization. The advantage is that the midframe synchronization establishes the frame phases of the overhead channels, such as digital voice orderwire channel, digital data/teletype orderwire channel, control and signalling channel, short sync binary "0" bit, short sync binary "1" bit and long sync channel. Thus, the second sync circuit, referred herein as the long sync circuit, does not have to examine all of the received data when searching for the long sync code.

The long sync code signal can be a lumped code in one of the overhead subchannels where interruption for the sync code will not disturb operations with the other data in the subchannel. The control and signalling overhead channel meets this requirement.

A second approach to the long sync code signal is to use an entire overhead channel to transmit the long sync code continuously which is the approach employed in the present invention. There are continuous pseudo-random codes which permit recognition of phase after receiving only part of the entire code; that is, the phase is indicated by any M consecutive bits of the sync code, where there are $2^M$ or less sync bits per code. The sync logic required for this type of code is comparable in cost to the sync logic for an M-bit lumped sync code. Faster synchronization can be achieved with the same circuit cost, but more sync bit rate is required. The greater sync bit rate requirement is not a disadvantage, however, in the present arrangement of the superframe code format, since a generous amount of overhead bit rate is available.

For these reasons, the psuedo-random type of long sync code is chosen. Since the phase of the long sync channel is indicated by the midframe synchronization, the long sync circuit examines only the received demultiplexed long sync signal, which cannot be disturbed by any data randomly simulating the sync code.

The short sync circuitry is simplified by using the shortest possible code. Also, using a given percentage of the overhead channel, for the short sync signal, a shorter code means a shorter frame, which permits a shorter synchronization time. The framing circuit for the short signal should not respond to any system failure which will cause the supergroup data to be all binary ones or zeros. Thus, the shortest code is the 0, 1 code.

The long sync code is a pseudo-random code whose generation will be described hereinbelow.

For lumped sync code signal formats, a shift register equal in length to the sync code can be used to detect the sync code and to make "code received" or "code not received" decisions at the bit rate. To accomplish this with a distributed code as employed for the short or first sync code signal, the shift register length must exceed the distance between the first and last bit of the code, in bits. For the example of the format of the short sync code illustrated and described herein this is 60 bits. The required length of the shift register is generally too expensive. Instead, one bit of the code is detected at a time. This is done by generating a local sync code and local sync timing from the receive timing counters which are to be synchronized employing the techniques fully illustrated and disclosed in U. S. Pat. No. 3,597,539 of J. M. Clark, whose disclosure is incorporated herein by reference. The received data is compared with the locally generated sync code to detect the code contained in the received data. If necessary, a small shift register of N bits can be used to increase the search rate by the ratio $\sqrt{N}$. This technique is fully described and illustrated in U. S. Pat. No. 3,594,502 of J. M. Clark, whose disclosure is incorporated herein by reference. This shift register stores the comparisons of the next N phases. When the search proceeds to a new phase, the stored comparison for that phase is combined with the most recent comparison.

For a continuous sync code, referred to herein as the long or second sync code signal, in an already-synchronized channel, it is not necessary to detect the code, but it is desired to detect whether the phase of the local timing signals agrees with the phase of the long sync code signal is received. This can be determined by using the code generating logic to predict the next sync bit from the previous sync bits as will be described hereinbelow in greater details with respect to FIG. 7. If the next sync bit mismatches the predicted bits, the phase of the local timing signals is wrong, as well as the predicted sync bits. If there is a match, it is most likely that the recently received sync bits are correct, but there is a very small probability that there were two or more bit errors.

The sense procedure must effectively average the sync detector output continuously to provide a reliable decision of whether the frame phase is correct, and to make the decision quickly, especially when synchronization is lost. The averaging or integration is necessary to obtain the required reliability in spite of bit errors. The speed and reliability requirements conflict; when one is increased, the other is decreased. The behavior of a number of averaging or integrating methods have been studied. These methods include resistor-capacitor filters, counting schemes, moving-interval averaging, and integration. It has been found that the best trade-off of speed and reliability is obtained by a type of clamped integrator. This is called a decision or betting circuit. The name "betting circuit" is employed because its operation is mathematically analogous to a betting situation. The decision or betting circuit integrates the digital input minus a bias, except that the output of the integration is limited, and the integration stops as long as the up or down limit is exceeded. A decision is made whether the integration output is above or below a given threshold. The decision basically depends on whether the probability of the digital input exceeds a threshold probability determined by the input bias.

The decision circuit can be implemented by either analog or digital circuits. The analog form has been constructed with a Miller-type integrator, clamp circuit, and comparator circuit. The digital form has been constructed with an up-down counter, where the bias is represented by the ratio of the up and down increments. The digital form has inherent stability, but its parameters are not continuously variable. However, using computer simulation and analysis allows one to accurately predict performance prior to physical breadboardings.

The operation of the decision circuit is a Markov process. Computer programs have been written and used to compute the response of this circuit and the distribution of search time, using the theory of Markov chains.

Each sync circuit requires a sense procedure. Each sync circuit may include a decision circuit or, by using the digital form of circuit, one decision circuit may serve both sync circuits, since the short sync must be synchronized before the long sync signal can effectively begin to search, and because the long sync will not be synchronized if the short sync signal is not synchronized.

The search procedure is enabled and disabled by the sense procedure. That is, the phase of the timing counters is not allowed to be changed unless it has been reliable determined that the frame phase is incorrect. The decisions made by the search procedure are designed to be as fast as possible, not reliable, since the reliability is obtained by the sense procedure.

For the distributed short sync code, the frame phases are tested one at a time in a way that will eventually cause every phase to be tested unless the correct phase is found first. The phase of the timing counters is changed to the next phase by inhibiting one clock pulse. The phase is changed whenever the sync detector indicates a mismatch, or, if a speed-up shift register is used, whenever the information in the shift register indicates that a mismatch was previously detected. When the sync detector indicates that the presently received bit matches the local sync bit, and the shift register does not indicate prior mismatches, the phase is not changed until the next local sync bit is generated. Meanwhile, the shift register accumulates information for the next N phases.

When the next local sync bit is generated, decisions are again made at the bit rate. When the correct phase is reached, it is most likely that enough matches will be obtained to disable the search procedure before a mismatch occurs. In a few cases, a mismatch occurs first, and the phase is changed, making the phase incorrect. It is then necessary for the search procedure to examine all the phases before obtaining the correct phase again. This situation predominantly causes a small percentage to synchronization times significantly greater than average.

Figures 5, 6, 7:
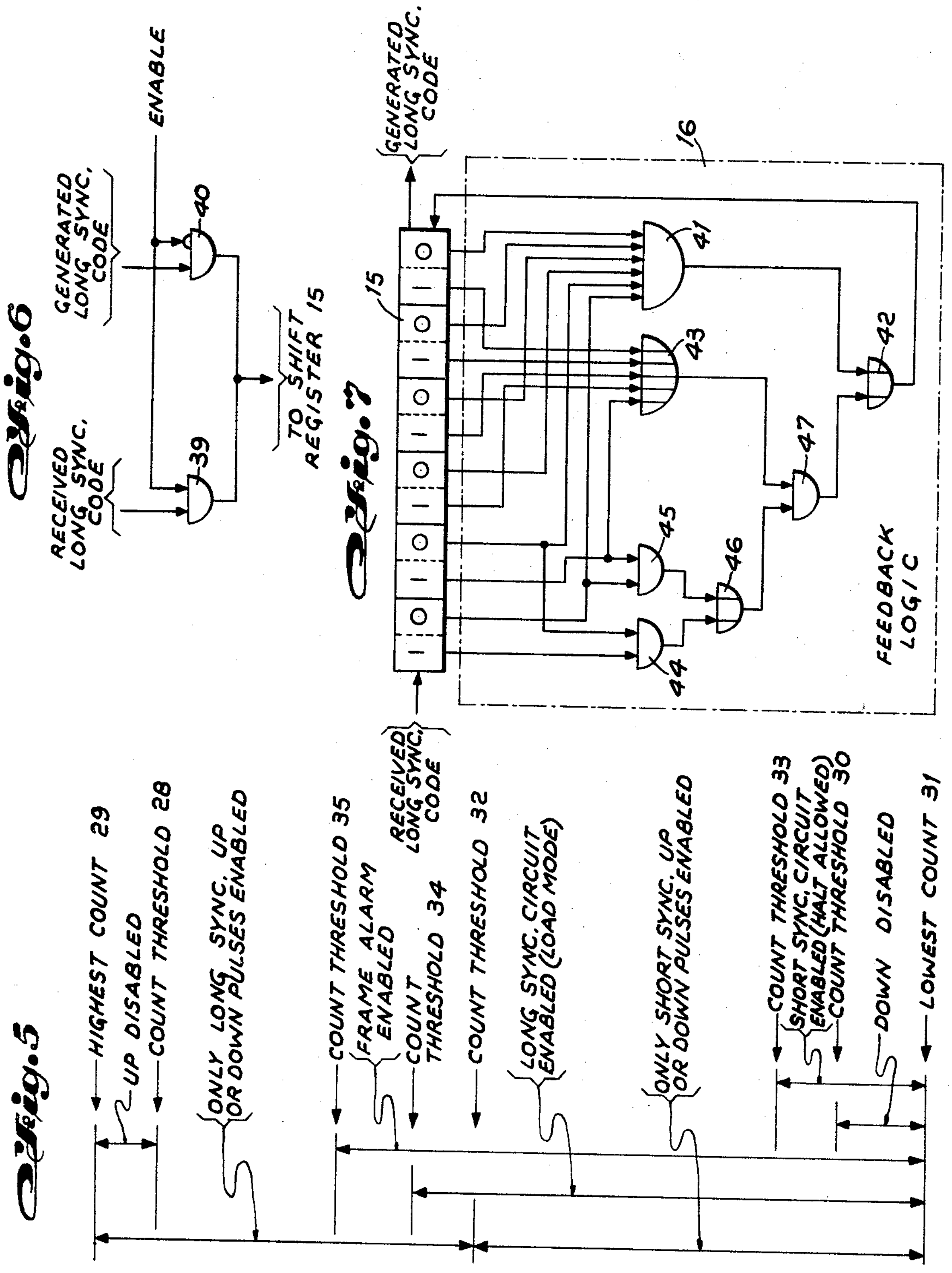
FIG. 5 is an illustration of the count thresholds in the decision circuit of FIG. 4 which enable certain operations in the frame synchronization system of FIG. 4.
FIG. 6 is a schematic illustration in block form of one embodiment of the switch logic of FIG. 4 associated with the long sync code generator contained in the superframe counter.
FIG. 7 is a schematic diagram in block form of one embodiment of the feedback logic contained in the superframe counter of FIG. 4 to generate the long sync code (second sync code).

For the psuedo-random long sync code, a shift register and feedback logic is used to generate a local sync code as will be described hereinbelow with respect to FIG. 7. Since the generating shift register repeats a fixed sequences of states, it also serves as a counter. The feedback of this shift register predicts the next received sync bits, both when the input to the shift register is the feedback, and when the input to the shift register is the received sync signal. When the sense circuit indicates a loss of sync, the received sync is gated to the shift register input, and after receiving enough consecutive error-free sync bits to fill the shift register, the shift register and its feedback will make correct predictions. This causes the sense circuit to indicate correct synchronization, and the feedback, rather than the received sync signal, is gated to the shift register input. In this mode, the predictions are independent of the received sync code, and, thus, will remain error-free, if these were no bit errors in the shift register when the gating into the shift register is changed. However, if there are bit errors, a bit error may be shifted into the shift register, causing a loss of synchronization.

The data format is adjusted to shift the phase of the short sync code at least once per superframe. It will be assumed that the format adjustment is made to produce only one such shift per superframe to minimize the disturbance of the short sync search function. There is no trouble when the local (receive) timing is synchronized, because the local timing and the received data format shift at the same time. When synchronization is lost, there may be two phase shifts per superframe (at different times), one due to the received data format adjustment and the other due to the local format adjustment. However, the local format adjustment can be inhibited when the sense circuit indicates that the long sync phase is incorrect. If the received format adjustment occurs when the short sync phase is incorrect, no harm is done, since the phase will be shifted to another incorrect phase, except for a special case where the phase is shifted to the correct phase. If, however, the received format adjustgent occurs when the short sync phase is correct, and the long sync phase is still incorrect, then the short sync phase will be made incorrect, and the short sync search will be prolonged instead of ending. If the received format adjustment occurs after the long sync phase is correct, no harm is done, because now the received and local format adjustments will be in phase. Thus, the search time is prolonged only if the receive format adjustment occurs between short sync and long sync acquisition. Using a pseudo-random long sync code, the long sync code sync acquisition time is much shorter than the superframe period, making the probability of a prolonged short sync search proportionately small.

The data signal format is illustrated in FIGS. 1, 2 and 3. To multiplex the group channels and the overhead channel, a midframe, as illustrated in Curve B, FIG. 1 composed of 15 subframes as illustrated in Curve C, FIG. 1 is constructed. 64 midframes make up the superframe as shown in Curve A, FIG. 1. As illustrated in Curve C, FIG. 1 the odd subframes in each midframe have 9 bits, and the even subframes have 8 bits. The first 8 bits of each subframe are assigned one bit at a time to the 4 or 8 channel groups. The ninth bit, if any, is assigned to the overhead channel. Thus, there are 8 overhead bits per midframe as illustrated in Curve B, FIG. 1 which are the 0 bit of the odd subframes of Curve C, FIG. 1. This scheme provides nominally correct data rates with minimal circuit cost and circuit complexity.

The format of the overhead channel as illustrated in Curve B, FIG. 1 is constructed by sub-multiplexing a control signal channel C, digital voice orderwire channels V, data and teletype orderwire channel D, the short sync code bits S0, S1, the long sync code bit L and for a 96 channel mode only unused bits. Two sync codes provide a more rapid synchronization of the lengthy data format than would be possible using only one sync code. Two overhead bits per midframe are used to transmit a 0, 1 short sync code, which suffices to synchronize the midframe. The long sync code, the control and signalling channel, and data and teletype orderwire channels are each assigned one bit per midframe. This provides each function 19,200 bits per second for 48 channel mode and 38,400 bits per second for 96 channel mode . The digital voice orderwire is assigned 3 bits per midframe, but only half of these bits are used for the 96 channel mode as illustrated in Curves A and B, FIG. 2, always obtaining 57.6 kilobits per second (Kb/s). The long sync channel is used to transmit the long sync code: the 64-bit psuedo-random code which defines a superframe of 64 midframes. This provides a basis for the submultiplexing of the control channel as illustrated in FIG. 3. In one superframe, eight words of 8 bits each are transmitted in the control channel C. The first 7 bits of each word is a control code used for communication between the transmit and receive control circuits of one group of channels. The eighth bit of these words are used for signalling associated with the voice and data orderwire channels.

The last short sync bit (S1) of each superframe is deleted, making the superframe 8,191 bits long instead of 8,192 bits long.

Figure 4:
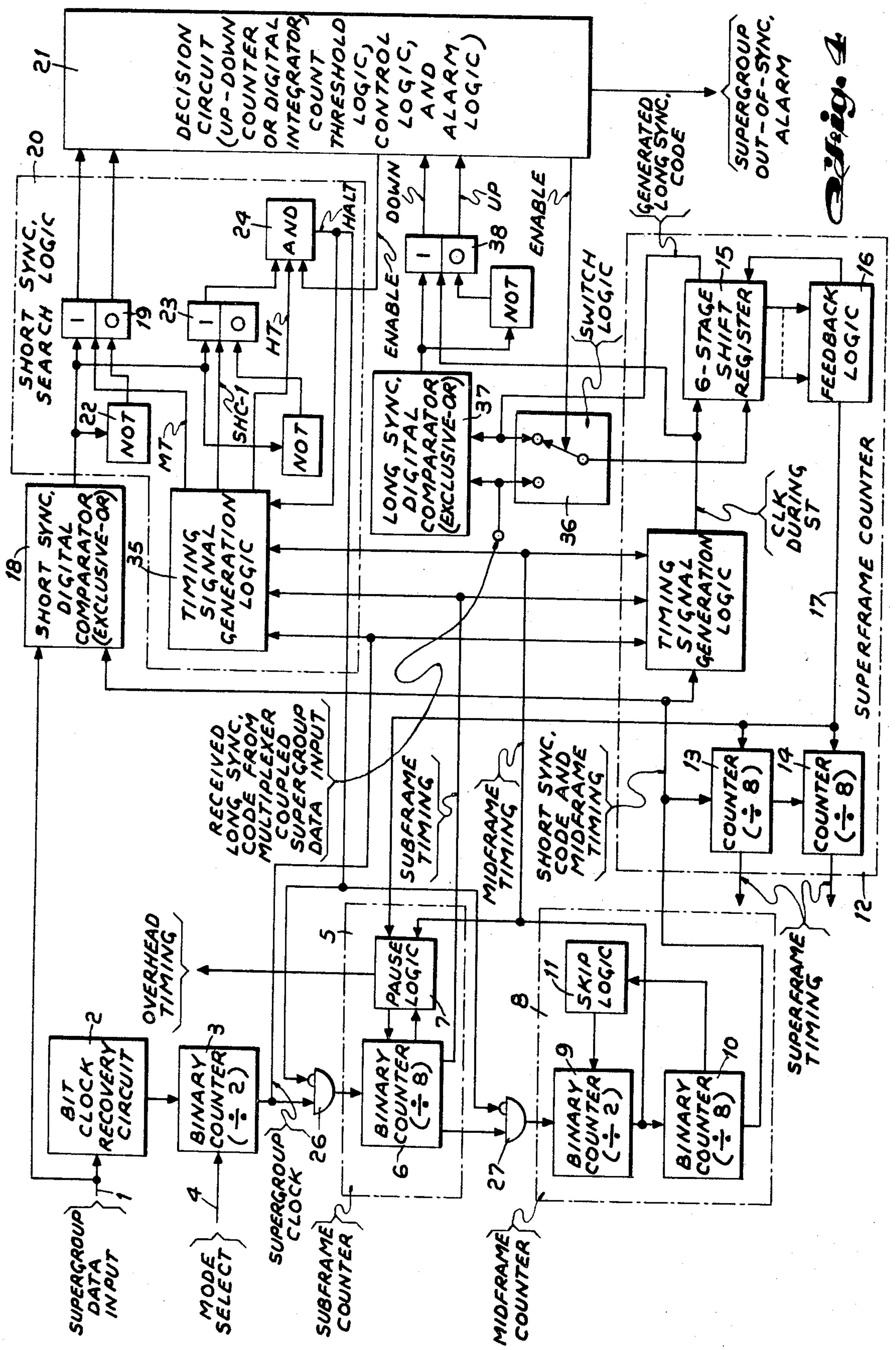
FIG. 4 is a schematic diagram in block form of one embodiment of the frame synchronization system in accordance with the principles of the present invention.

Referring to FIG. 4, there is illustrated therein a schematic diagram in block form of one embodiment of the synchronization system in accordance with the principles of the present invention. The supergroup data is applied to input 1 and coupled to bit clock recovery circuit 2 to recover from the supergroup data the bit rate from the supergroup data which is, for example, in the order of 4,915.2 KHZ (kilohertz). Circuit 2 may take the form disclosed in U. S. Pat. No. 3,633,115 of M. A. Epstein. The divide by two clock divider or counter 3 is enabled or disabled by the mode select signal applied to conductor 4 to obtain a supergroup frame with a frequency of 2,457.6 KHZ for a 48-channel mode and a frequency of 4,915.2 KHZ for a 96-channel mode. The subframe counter 5 includes a divide-by-8 binary counter 6 and pause logic 7. Pause logic 7 stops counter 6 for one clock period, thus, creating a ninth count, whenever enabled by the midframe and superframe counters. This causes the subframe to be either 8 or 9 bits long according to the data format. The pause timing also provides timing for the overhead channel.

Midframe counter 8 is a divide-by-15 counter formed by a binary divide-by-16 counter in the form of counters 9 and 10 with skip logic that causes the counter to skip the 16th count. The output of counter 9 is used to enable the pause logic 7. The midframe timing is decoded as required to select the various overhead subchannels according to the data formats. The output of counter 10 which is formed by three divide-by-two counters provides the midframe timing and the locally generated short sync code.

Superframe counter 12 is, in effect, two divide-by-64 counters operated by the same clock. One divide-by-63 counter is a string of six divide-by-2 circuits, which are illustrated for convenience as two divide-by-8 counters 13 and 14. The other divide-by-64 counter is a 6-bit shift register 15 with feedback logic 16 designed to produce a pseudo-random sequence of 64 bits which is the locally generated long sync code signal. One pulse per cycle from the long sync code generator coupled on conductor 17 is used to reset counters 13 and 14, thus, keeping both counters synchronized to one another. Counter 13 defines the timing of each 8 bit word of the control channel (a 7-bit control word and a signalling bit) and counter 14 defines the multiplexing of eight such words in each superframe.

The supergroup data on conductor 1 is continuously compared with the short sync code signal generated at the output of counter 10 in digital comparator 18. The match and mismatch output of comparator 18 (mismatch equals binary 1 and match equals binary 0) is coupled to sampling flip flop 19 of the short sync search logic 20. When a mismatch is present at the output of comparator 18 there is a 1 output from the 1 output of flip flop 19 which causes decision circuit 21, in the form of an up-down counter, to count down one count. When a match signal occurs at the output of comparator 18 the resultant binary 0 is inverted in NOT gate 22 and applied to the 0 input of flip flop 19 resulting in a binary 1 at the 0 output of flip flop 19 which causes decision circuit 21 to count up one count. The remainder of the circuit of search logic 20 including flip flop 23, AND gate 24 and timing signal generation logic 35 are more fully disclosed in the above-cited U. S. Pat. No. 3,597,539. The circuitry of search logic 20 could take the form illustrated in the above-cited U. S. Pat. No. 3,594,502. In each embodiment there is required timing signal generation logic 35 that produces various timing signals, such as timing signals MT, SHC and HT as presented in FIG. 4 and another timing signal ST necessary in producing both the timing signals MT and SHC. These timing signals are produced by logic 35 by logically combining the supergroup clock, the subframe timing and the midframe timing together with the HALT output of AND 24. These timing signals will have certain relative timing and widths as described in either of the cited U. S. Pat. Nos. 3,597,539 and 3,594,502 with the relative width and the relative timing of these timing signals being dictated by the format of the data signal operated upon.

Search logic 20, when enabled by the ENABLE signal of decision circuit 21 generates a HALT pulse whenever the timing logic 35 indicate that a short sync bit should be received and when comparator 18 indicates a mismatch between the received generated short sync code at this time. A mismatch at this time also causes a "down" pulse to be sent to the decision circuit 21. A match at this time generates an "up" pulse instead. The HALT signal is used to inhibit the counting of one or both of the subframe counters 5 and 8 such as through means of INHIBIT gates 26 and 27. A succession of mismatches will cause a continued HALT condition until a match is detected, but no more up or down pulses are generated until the next time that a short sync bit should arrive. When the search logic 20 is disabled, up or down pulses are generated depending on the comparison obtained when a sync bit is supposed to arrive, but no HALT pulses are allowed.

Decision circuit 21 is an up-down binary counter shared by the short sync and long sync portions of the framing logic. Its operation depends on whether the count is above or below certain count thresholds as illustrated in FIG. 5. The up pulses are disabled in a region near the highest count, such as between count threshold 28 and the highest count 29. This prevents the counter from cycling back to a low count. Similarly, down pulses are disabled in a region nearest the lowest count, such as between count threshold 30 and the lowest count 31. There is a count threshold 32 near the center of the diagram of FIG. 5 that separates the controlling action of the long sync and short sync circuits. Above threshold 32, decision circuit 21 responds only to up and down pulses from the long sync circuit, and below threshold 32, decision circuit 21 counts up or down as controlled only by the short sync circuit. In a lower portion of each of these two regions, the associated circuit is allowed to change the frame phase. In the case of the short sync, HALT pulses are generated to change the frame phase below count threshold 33. In the case of the long sync, a "load mode" is used. This occurs below count threshold 34. Below count threshold 35, the frame alarm is enabled. The various count thresholds and the action dictated thereby will depend on the binary condition in the 1 output of the counting stages up to the count threshold under consideration. For instance, an OR gate coupled to 1 output of the stages of the counter between the lowest count 31 and count threshold 30 will provide a 1 for every stage that assumes a 1 state to provide the desired ENABLE signal for logic circuit 20. Similarly, an OR gate coupled to the 1 output of the stages of the counter between the lowest count 31 and the count threshold 35 will provide a 1 output for every stage that assumes a 1 state to provide the desired "frame alarm" or "out-of-sync alarm".

When synchronization is lost, mismatches cause down pulses, and after a while the state of decision circuit 21 is at or near the lowest count (between threshold 30 and lowest count 31). Here, the short sync circuit is allowed to generate HALT pulses which eventually correct the midframe phase. For the condition of correct midframe phases, there are more short sync matches than mismatches, and, thus, more up pulses than down pulses. Decision circuit 21 then counts up to the point, namely, count threshold 32, where it is controlled by the long sync circuit. In the operation of the long sync circuit the achievement of correct long sync phase causes the count of decision circuit 21 to continue upward, disabling further changes of frame phase and disabling the frame alarm. Bit errors can cause the search logic to make wrong decisions and may move the count in the wrong direction, but each bit error can change the count only slightly. Thus, the framing circuits can continue after an error from nearly the same state as before the error, or nearly the same as if the error had not occurred. In a similar manner, the decision circuit 21 protects against bit errors when synchronized by preventing a false sensing of the out-of-sync condition.

The long sync framing circuit includes shift register 15 and feedback logic 16 in addition to a feedback circuit through switch logic 36 which generates the local long sync code for use in long sync digital comparator 37 which in conjunction with sampling flip flop 38 produces the up and down outputs as similarly described with respect to flip flop 19 of short sync search logic 20. The received long sync code is demultiplexed from the overhead channel of the superframe format. This demultiplexing is fully described in the copending application of J. M. Clark - R. H. Haussmann, Ser. No. 244,753, filed Apr. 17, 1972, whose disclosure is incorporated herein by reference. This demultiplexing is correctly timed when the short sync code is synchronized, that is, when the midframe timing is correct. When the superframe timing is also correct, the received and generated long sync codes will match (except, of course, for received bit errors). The long sync comparator compares the received and generated long sync code in comparator 37 and generates through flip flop 38 "up pulses" if there is a match (binary 0 at the output of comparator 37), or a down pulse if there is a mismatch (binary 1 at the output of comparator 37). Mismatches, thus, cause the count to decrease until an ENABLE signal is provided to switch logic 36. Switch logic 36 is illustrated as a mechanical switch in FIG. 4, but may take the form illustrated in FIG. 6 which includes an AND gate 39 to pass the received long sync code signal to shifter register 15 when the long sync ENABLE signal is present and an INHIBIT gate 40 which inhibits the coupling of the generated long sync code to the input of shift registers 15.

When switch logic 36 is in the disabled position, as illustrated in FIG. 4, the ENABLE for the long sync circuit switches the switch of logic 36 so that the received long sync signal is coupled to the input of shift register 15. This condition is what has been referred to as the load mode hereinabove, because the received long sync bits are loaded into the shift register displacing the generated long sync bits previously stored. As soon as shift register 15 is filled with error-free long sync bits, the generated long sync code signal will match the received long sync code signal without errors. The matches detected by comparator 37 causes up pulses to be generated, which increases the count of decision circuit 21 and disables the long sync ENABLE signal. This causes switch logic 36 to switch back to the position illustrated so that the generated long sync code as generated by shift register 15 and feedback logic 16 are coupled to the input of shift register 15. In this feedback mode, the feedback path is closed and the shift register continues to generate the long sync code with no dependence on the received long sync code, and, thus, uneffected by bit errors. This mode persists if the shift register is synchronized to the received long sync codes. As previously mentioned, counters 13 and 14 of superframe counter 12 is synchronized by pulses generated from the shift register 15 and coupled thereto by conductor 17.

The generation of the long sync code will now be described with reference to FIG. 7 which illustrates therein a six stage shift register 15 and one embodiment of feedback logic 16 which operates as follows: From any 6-bits contained in shift register 15 (a sequence of six bits, ordered from left to right), a new bit is generated as follows: If the six bit code is all zeros (binary 0) as detected by AND gate 41, or (the logic function being performed by OR gate 42), if at least one of the five right-most bits is a binary 1 (as determined by OR gate 43) and (the logical function be performed by AND gate 47) the two left-most bits are different (as detected by AND gate 44 and 45 and OR gate 46), the new bit is a binary 1. If this logical statement is not met then the new bit is a binary 0. Generate a new 6-bit code by adding the new bit at the right and removing the left-most bit. From the new code generate a new bit. From this bit generate another code as before and so forth. This procedure repeated 58 times generates a sequence of bits which repeats once every 64 bits.

After receiving only six bits of the 64-bit code, and using the procedure as outlined hereinabove, it is possible to achieve synchronization in less than one code period or superframe.

While I have described above the principles of my invention in connection with specific apparatus it is to be more clearly understood that this description is made only by way of example and not as a limitation to the scope of my invention as set forth in the objects thereof and in the accompanying claims.

I claim:

1. A frame synchronization system for a time division multiplex binary data signal having a superframe including M midframes, each of said M midframes including *m* subframes, said data signal including a first sync signal having a first predetermined pattern disposed in each of said M midframes and a second sync signal having a second predetermined pattern different than said first predetermined pattern composed of M bits, each of said M bits being disposed in a different one of said M midframes, where M and m are integers greater than one, comprising:

a source of said data signal;

first means coupled to said source to produce timing signals including said first sync signal;

second means to locally generate said second sync signal;

a first digital comparator coupled to said source and said first means responsive to said data signal and said first sync signal to produce a first output signal indicative of the matches and mismatches between said data signal and said first sync signal;

an integrating circuit having a plurality of threshold levels coupled to said first comparator responsive to said matches and mismatches to produce a first control signal indicative of the phase relation between said first sync signal contained in said data and said first sync signal generated by said first means;

third means coupled to said first comparator, said integrating circuit and said first means responsive to at least said mismatches and said first control signal below a first one of said threshold levels to control the phase of said timing signals with respect to said data signal to establish and maintain synchronization of said M midframes;

a second digital comparator coupled to said source, said second means and said integrator circuit responsive to said second sync signal contained in said data signal and said second sync signal generated by said second means to produce a second output signal indicative of the matches and mismatches between said M bits of said second sync signal contained in said data signal and said M bits of said second sync signal generated by said second means, said second output signal being coupled to said integrating circuit to produce a second control signal; and fourth means coupled to said source, said second means and said integrator responsive to said second control signal below a second one of said threshold levels different than said first one of said threshold levels to substitute said second sync signal contained in said data signal for said second sync signal generated by said second means to provide in said second means said second sync signal identical to said second sync signal contained in said data;

said third and fourth means cooperating to establish and maintain synchronization of said superframe.

2. A system according to claim 1, wherein said first sync signal includes a binary 0 bit and a binary 1 bit separated from each other by a given number of bits.

3. A system according to claim 1, wherein said second sync signal is an M-bit pseudo-random code.

4. A system according to claim 1, wherein said first sync signal includes a binary 0 bit and a binary 1 bit separated from each other by a given number of bits; and said second sync signal is an M-bit pseudo-random code.

5. A system according to claim 1, wherein each of said first and second comparators include an EXCLUSIVE-OR gate.

6. A system according to claim 1, wherein said integrating circuit includes a digital integrator.

7. A system according to claim 6, wherein said digital integrator includes an up-down binary counter.

8. A system according to claim 1, wherein said first means includes fifth means coupled to said source to recover the bit clock from said data signal, a plurality of binary counters coupled in cascade with respect to each other and said fifth means to generate timing signals for said *m* subframes, timing signals for said M midframes, timing signals for said superframe and said first sync signal, and logic circuitry coupled into at least one selected point of said cascade arrangement of said plurality of binary counters responsive to said first control signal below said first one of said threshold levels to inhibit the flow of pulses at said selected point to control the phase of said timing signals with respect to said data signal to establish synchronization of said M midframes.

9. A system according to claim 1, wherein said second means includes a six stage shift register containing therein a given pattern of binary ones and zeros ordered from left to right, and feedback logic coupled to said stages of said shift register to produce said second sync signal composed of M bits by sequentially examining the binary condition of said stages of said shift register (M–6) times and inserting after each of said examinations and prior to the next examination a binary 1 in the most left hand stage of said shift register when a given logic statement is true and a binary 0 when said logic statement is false, said logic statement being if each stage contains a binary 0, or if at least one of the five right-most stages contains a binary 1 and the two left-most stages contain different binary conditions.

10. A system according to claim 1, wherein said first sync signal includes a binary 0 bit and a binary 1 bit separated from each other by a given number of bits;

said second sync signal is an M-bit pseudo-random code;

each of said first and second comparators include an EXCLUSIVE-OR gate;

said integrating circuit includes an up-down binary counter;

said first means includes fifth means coupled to said source to recover the bit clock from said data signal, a plurality of binary counters coupled in cascade with respect to each other and said fifth means to generate timing signals for said m subframes, timing signals for said M midframes, timing signals for said superframe and said first sync signal, and logic circuitry coupled into at least one selected point of said cascade arrangement of said plurality of binary counters responsive to said first control signal below said first one of said threshold levels to inhibit the flow of pulses at said selected point to control the phase of said timing signals with respect to said data signal to establish synchronization of said M midframes; and said second means includes a six stage shift register containing therein a given pattern of binary ones and zeros ordered from left to right, and feedback logic coupled to said stages of said shift register to produce said second sync signal composed of M bits by sequentially examining the binary condition of said stages of said shift register (*m*–6) times and inserting after each of said examinations and prior to the next examination a binary 1 in the most left hand stage of said shift register when a given logic statement is true and a binary 0 when said logic statement is false, said logic statement being if each state contains a binary 0, or if at least one of the five right-most stages contains a binary 1 and the two left-most stages contain different binary conditions.

* * * * *